United States Patent
Suzuki (10) Patent No.: US 11,801,907 B2
(45) Date of Patent: Oct. 31, 2023

(54) DUAL FRONT, SINGLE REAR-WHEELED THREE-WHEELER

(71) Applicant: YAMAHA HATSUDOKI KABUSHIKI KAISHA, Iwata (JP)

(72) Inventor: Masato Suzuki, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 255 days.

(21) Appl. No.: 17/506,643

(22) Filed: Oct. 20, 2021

(65) Prior Publication Data

US 2022/0041231 A1 Feb. 10, 2022

Related U.S. Application Data

(63) Continuation-in-part of application No. PCT/JP2019/049772, filed on Dec. 19, 2019.

(30) Foreign Application Priority Data

Apr. 22, 2019 (JP) ................................ 2019-080758

(51) Int. Cl.
  *B62D 61/06* (2006.01)
  *B60K 1/00* (2006.01)
  (Continued)

(52) U.S. Cl.
  CPC .............. *B62D 61/065* (2013.01); *B60K 1/00* (2013.01); *B60K 1/04* (2013.01); *B60N 2/005* (2013.01); *B62D 21/07* (2013.01)

(58) Field of Classification Search
  CPC .................... B62D 61/065; B60K 1/04; B60K 2001/0438; B62K 5/05; B60N 2/005
  See application file for complete search history.

(56) References Cited

U.S. PATENT DOCUMENTS 4,448,278 A * 5/1984 Badsey ................ B62D 61/065
  296/64
4,703,824 A * 11/1987 Irimajiri ............... B62D 61/065
  180/215

(Continued)

FOREIGN PATENT DOCUMENTS

CN 2340662 9/1999
CN 101973322 A 2/2011

(Continued)

*Primary Examiner* — Paul N Dickson
*Assistant Examiner* — Timothy Wilhelm
(74) *Attorney, Agent, or Firm* — Rabin & Berdo, P.C.

(57) ABSTRACT

A three-wheeler including two front wheels and a rear wheel, left and right seats, a steering mechanism steering the front wheels, an electric motor generating a torque by electrical energy, a power transmission mechanism transmitting the torque to the front wheels, and a body frame. A center of gravity of the three-wheeler is more frontward than a front end of the two seats and than a middle point of the wheelbase, and is more rearward than a front end of the electric energy storage device. The seats is, in a top view, partially in a triangle area that has a center of each of the front wheels and the rear wheel as vertices. The electric energy storage device, in the top view, overlaps a foot-resting area and is partially in the triangle area. The electric energy storage device is between the two front wheels.

13 Claims, 2 Drawing Sheets

(51) Int. Cl.
   *B60K 1/04*   (2019.01)
   *B60N 2/005*  (2006.01)
   *B62D 21/07*  (2006.01)

(56) References Cited

U.S. PATENT DOCUMENTS

| | | | | |
|---|---|---|---|---|
| 5,248,011 | A * | 9/1993 | Richards | B60G 3/01 |
| | | | | 180/215 |
| 5,343,973 | A * | 9/1994 | Lanker | B62D 29/046 |
| | | | | 180/312 |
| 7,143,853 | B1 * | 12/2006 | Mercier | B62D 61/065 |
| | | | | 303/9.62 |
| 8,313,121 | B2 * | 11/2012 | Rolfe | B60L 1/003 |
| | | | | 280/832 |
| 8,544,587 | B2 * | 10/2013 | Holroyd | B62K 5/06 |
| | | | | 280/798 |
| 9,221,508 | B1 * | 12/2015 | de Haan | B60N 2/005 |
| 9,511,657 | B2 * | 12/2016 | Engler | B60L 53/80 |
| 9,604,683 | B2 * | 3/2017 | Kunsch | B62D 61/06 |
| 9,643,656 | B1 | 5/2017 | Hall et al. | |
| 9,783,257 | B2 * | 10/2017 | Frohnmayer | B60K 1/00 |
| 10,513,303 | B2 * | 12/2019 | Frohnmayer | B60K 7/0007 |
| 10,576,817 | B2 * | 3/2020 | Battaglini | B60G 3/20 |
| 11,097,606 | B2 * | 8/2021 | Trenne | B62K 5/027 |
| 11,299,223 | B2 * | 4/2022 | Kunsch | B60K 5/00 |
| 11,660,925 | B2 * | 5/2023 | Doerksen | B62D 61/065 |
| | | | | 701/37 |
| 2008/0238140 | A1 * | 10/2008 | Kejha | B60K 6/46 |
| | | | | 296/181.1 |
| 2009/0152940 | A1 * | 6/2009 | Mercier | B62K 5/05 |
| | | | | 303/113.2 |
| 2012/0241237 | A1 | 9/2012 | Holroyd et al. | |
| 2013/0105238 | A1 | 5/2013 | Hall et al. | |
| 2016/0176457 | A1 | 6/2016 | De Haan | |
| 2018/0057097 | A1 | 3/2018 | Frohnmayer | |
| 2018/0251172 | A1 | 9/2018 | Hall et al. | |

FOREIGN PATENT DOCUMENTS

| | | |
|---|---|---|
| CN | 103442976 A | 12/2013 |
| JP | H05208617 A | 8/1993 |
| JP | H09286255 A | 11/1997 |
| WO | 2016135691 A2 | 9/2016 |

* cited by examiner

DUAL FRONT, SINGLE REAR-WHEELED THREE-WHEELER

CROSS-REFERENCE TO RELATED APPLICATIONS

This is a continuation-in-part application of International Application PCT/JP2019/049772 filed on Dec. 19, 2019, which claims priority from a Japanese Application No. 2019-080758, filed on Apr. 22, 2019. The contents of the applications are incorporated herein by reference.

TECHNICAL FIELD

The present invention relates to a dual front, single rear-wheeled three-wheeler.

BACKGROUND ART

A three-wheeler provided with a body frame described below has been known as a three-wheeler. When the dual front, single rear-wheeled three-wheeler turns in the leftward direction, the body frame does not turn in the leftward direction. When the dual front, single rear-wheeled three-wheeler turns in the rightward direction, the body frame does not turn in the rightward direction. As such a dual front, single rear-wheeled three-wheeler, for example, a three-wheeler disclosed in Patent Literature 1 is known. The three-wheeler disclosed in Patent Literature 1 is provided with side-by-side seats. The side-by-side seats include a sit-in type left seat and a sit-in type right seat disposed on the right side of the left seat. An operator sits on the left seat or the right seat. This type of a three-wheeler as disclosed in Patent Literature 1 is a vehicle driven by an engine.

Meanwhile, as a dual front, single rear-wheeled three-wheeler, a three-wheeler disclosed in Patent Literature 2 is also known. The three-wheeler disclosed in Patent Literature 2 is provided with a battery and an electric motor instead of an engine. The three-wheeler disclosed in Patent Literature 2 is an electric vehicle driven by an electric motor. This type of a three-wheeler as disclosed in Patent Literature 2 has a structure provided with a replaceable battery.

CITATION LIST

Patent Literature

Patent Literature 1: U.S. Patent Application Publication No. 2018/0251172
Patent Literature 2: U.S. Pat. No. 9,643,656

SUMMARY OF INVENTION

Problem to be Solved by the Invention

As described above, electrification of dual front, single rear-wheeled three-wheelers has been desired.

Thus, the present invention has an object to achieve the electrification of a dual front, single rear-wheeled three-wheeler.

Solution to Problem

A dual front, single rear-wheeled three-wheeler of (1) includes:
side-by-side seats that include a sit-in type left seat and a sit-in type right seat disposed on the right of the left seat and configured such that an operator sits on the left seat or the right seat;
a left front drive steerable wheel, a right front drive steerable wheel, and a rear wheel;
a steering mechanism that steers the left front drive steerable wheel and the right front drive steerable wheel by operation of the operator,
an electric energy storage device that stores electrical energy;
an electric motor that generates torque by the electrical energy stored in the electric energy storage device;
a power transmission mechanism that transmits the torque generated by the electric motor to the left front drive steerable wheel and the right front drive steerable wheel; and
a body frame that does not lean in the leftward direction upon left turning and does not lean in the rightward direction upon right turning, and supports the side-by-side seats, the left front drive steerable wheel, the right front drive steerable wheel, the rear wheel, the steering mechanism, the electric energy storage device, the electric motor, and the power transmission mechanism,
wherein
assuming that, when the dual front, single rear-wheeled three-wheeler is seen in a downward direction, an area surrounded by a triangle obtained by linking a center of the left front drive steerable wheel, a center of the right front drive steerable wheel, and a center of the rear wheel with straight lines is defined as a triangle area, the dual front, single rear-wheeled three-wheeler satisfies the following conditions (A) and (B):
(A) a front end of the side-by-side seats is positioned more rearward than the center of gravity of the dual front, single rear-wheeled three-wheeler, the center of gravity being disposed more frontward than a middle point of a wheelbase, and at least a part of the side-by-side seats is positioned in the triangle area when the dual front, single rear-wheeled three-wheeler is seen in the downward direction; and
(B) at least a part of the electric energy storage device overlaps a foot of the operator sat on the side-by-side seats when the dual front, single rear-wheeled three-wheeler is seen in the downward direction and is positioned in the triangle area, and the electric energy storage device is positioned such that its front end is more frontward than the center of gravity of the dual front, single rear-wheeled three-wheeler and positioned in the triangle area, and the electric energy storage device is positioned such that its left end and right end are between a right end of the left front drive steerable wheel and the left end of the right front drive steerable wheel in the leftward-rightward direction.

According to the dual front, single rear-wheeled three-wheeler of (1), the dual front, single rear-wheeled three-wheeler travels by the torque generated by the electric motor. Thus, electrification of dual front, single rear-wheeled three-wheelers is achieved.

According to the dual front, single rear-wheeled three-wheeler of (1), reduction of the load applied on the left front drive steerable wheel and the right front drive steerable wheel can be suppressed, and also the occurrence of rolling on the body frame can be suppressed when the dual front, single rear-wheeled three-wheeler turns in the leftward direction or the rightward direction. More specifically, the electric energy storage device is positioned such that its left end and right end are between the right end of the left front drive steerable wheel and the left end of the right front drive steerable wheel in the leftward-rightward direction. Thus, the electric energy storage device is disposed in the vicinity of the center in the leftward-rightward direction of the dual front, single rear-wheeled three-wheeler. Due to this configuration, the occurrence of rolling on the body frame can be suppressed when the dual front, single rear-wheeled three-wheeler turns in the leftward direction or the rightward direction.

The electric energy storage device is positioned such that its left end and right end are between the right end of the left front drive steerable wheel and the left end of the right front drive steerable wheel in the leftward-rightward direction. Thus, the width of the electric energy storage device in the leftward-rightward direction becomes short. The length in the frontward-rearward direction of the electric energy storage device should be long for ensuring the capacity of the electric energy storage device. Then, at least a part of the electric energy storage device overlaps a foot of an operator sat on the side-by-side seats and is positioned in the triangle area when the dual front, single rear-wheeled three-wheeler is seen in the downward direction. In this way, the electric energy storage device extends toward the front part of the dual front, single rear-wheeled three-wheeler. Thus, the load of the electric energy storage device tends to be applied on the left front drive steerable wheel and the right front drive steerable wheel. Due to this configuration, the reduction of the load applied on the left front drive steerable wheel and the right front drive steerable wheel can be suppressed.

The dual front, single rear-wheeled three-wheeler of (2) has a feature, wherein, in the dual front, single rear-wheeled three-wheeler of (1), the electric energy storage device is positioned such that its front end is in the triangle area when the dual front, single rear-wheeled three-wheeler is seen in the downward direction.

The dual front, single rear-wheeled three-wheeler of (3) has a feature, wherein, in the dual front, single rear-wheeled three-wheeler of (1) or (2), at least a part of the left seat and/or at least a part of the right seat are/is positioned in the triangle area when the dual front, single rear-wheeled three-wheeler is seen in the downward direction.

According to the dual front, single rear-wheeled three-wheeler of (3), at least a part of the left seat and/or at least a part of the right seat are/is positioned in the triangle area when the dual front, single rear-wheeled three-wheeler is seen in the downward direction. Due to this configuration, at least a part of an operator and/or at least a part of a passenger are/is positioned in the triangle area when the dual front, single rear-wheeled three-wheeler is seen in the downward direction. Thus, the operator and/or the passenger are/is disposed in the vicinity of the center in the leftward-rightward direction of the dual front, single rear-wheeled three-wheeler. Due to this configuration, the occurrence of rolling on the body frame of the dual front, single rear-wheeled three-wheeler can be suppressed when the three-wheeler turns in the leftward direction or the rightward direction.

The dual front, single rear-wheeled three-wheeler of (4) has a feature, wherein, in the dual front, single rear-wheeled three-wheeler of any one of (1) to (3), the left seat and the right seat are positioned between the right end of the left front drive steerable wheel and the left end of the right front drive steerable wheel when the dual front, single rear-wheeled three-wheeler is seen in the downward direction.

According to the dual front, single rear-wheeled three-wheeler of (4), the left seat and the right seat are positioned between the right end of the left front drive steerable wheel and the left end of the right front drive steerable wheel when the dual front, single rear-wheeled three-wheeler is seen in the downward direction. Due to this configuration, an operator and a passenger are positioned between the right end of the left front drive steerable wheel and the left end of the right front drive steerable wheel when the dual front, single rear-wheeled three-wheeler is seen in the downward direction. Thus, the operator and/or the passenger are/is disposed in the vicinity of the center in the leftward-rightward direction of the dual front, single rear-wheeled three-wheeler. Due to this configuration, the occurrence of rolling on the body frame of the dual front, single rear-wheeled three-wheeler can be suppressed when the three-wheeler turns in the leftward direction or the rightward direction.

The dual front, single rear-wheeled three-wheeler of (5) has a feature, wherein, in the dual front, single rear-wheeled three-wheeler of any one of (1) to (4), a part of the electric energy storage device is positioned outside the triangle area when the dual front, single rear-wheeled three-wheeler is seen in the downward direction.

According to the dual front, single rear-wheeled three-wheeler of (5), a part of the electric energy storage device is positioned outside the triangle area when the dual front, single rear-wheeled three-wheeler is seen in the downward direction. Due to this configuration, the size of the electric energy storage device becomes large, and the capacity of the electric energy storage device becomes large.

The dual front, single rear-wheeled three-wheeler of (6) has a feature, wherein, in the dual front, single rear-wheeled three-wheeler of any one of (1) to (5), a part of the electric motor and/or a part of the power transmission mechanism is/are positioned more frontward than a front end of the triangle area in the frontward-rearward direction.

According to the dual front, single rear-wheeled three-wheeler of (6), the reduction of the load applied on the left front drive steerable wheel and the right front drive steerable wheel can be suppressed. More specifically, the electric motor and the power transmission mechanism are heavy objects. Thus, a part of the electric motor and/or a part of the power transmission mechanism is/are positioned more frontward than the front end of the triangle area in the frontward-rearward direction. Due to this configuration, the load of the electric motor and/or the load of the power transmission mechanism tends to be applied on the left front drive steerable wheel and the right front drive steerable wheel. As a result, the reduction of the load applied on the left front drive steerable wheel and the right front drive steerable wheel can be suppressed.

The dual front, single rear-wheeled three-wheeler of (7) has a feature, wherein, in the dual front, single rear-wheeled three-wheeler of any one of (1) to (6), the electric energy storage device is positioned such that its front end is more frontward than the center of gravity of the triangle area in the frontward-rearward direction.

According to the dual front, single rear-wheeled three-wheeler of (7), the reduction of the load applied on the left front drive steerable wheel and the right front drive steerable wheel can be suppressed. More specifically, the electric energy storage device is a heavy object. Thus, the front end of the electric energy storage device is positioned more frontward than the center of gravity of the triangle area in the frontward-rearward direction. Due to this configuration, the load of the electric energy storage device tends to be applied on the left front drive steerable wheel and the right front drive steerable wheel. As a result, the reduction of the load applied on the left front drive steerable wheel and the right front drive steerable wheel can be suppressed.

The dual front, single rear-wheeled three-wheeler of (8) has a feature, wherein, in the dual front, single rear-wheeled three-wheeler of any one of (1) to (7), the maximum width of the electric energy storage device in the leftward-rightward direction is smaller than a width of the triangle area in the leftward-rightward direction at the center of gravity of the triangle area.

According to the dual front, single rear-wheeled three-wheeler of (8), the occurrence of rolling on the body frame can be suppressed when the dual front, single rear-wheeled three-wheeler turns in the leftward direction or the rightward direction. More specifically, the maximum width of the electric energy storage device in the leftward-rightward direction is smaller than a width of the triangle area in the leftward-rightward direction at the center of gravity of the triangle area. Thus, the maximum width of the electric energy storage device in the leftward-rightward direction is small. Due to this configuration, the electric energy storage device can be easily disposed in the vicinity of the center in the leftward-rightward direction of the dual front, single rear-wheeled three-wheeler. As a result, the occurrence of rolling on the body frame can be suppressed when the dual front, single rear-wheeled three-wheeler turns in the leftward direction or the rightward direction.

The dual front, single rear-wheeled three-wheeler of (9) has a feature, wherein, in the dual front, single rear-wheeled three-wheeler of any one of (1) to (8), a maximum width of the electric energy storage device in the leftward-rightward direction is larger than a width of the triangle area in the leftward-rightward direction at a middle point between the center of gravity of the triangle area and the rear end of the triangle area.

According to the dual front, single rear-wheeled three-wheeler of (9), the capacity of the electric energy storage device becomes large because the maximum width of the electric energy storage device in the leftward-rightward direction is large.

The dual front, single rear-wheeled three-wheeler of (10) has a feature, wherein, in the dual front, single rear-wheeled three-wheeler of any one of (1) to (9), at least a part of the electric energy storage device overlaps the left seat and the right seat in the triangle area when the dual front, single rear-wheeled three-wheeler is seen in the downward direction.

The dual front, single rear-wheeled three-wheeler of (11) has a feature, wherein, in the dual front, single rear-wheeled three-wheeler of any one of (1) to (10), the electric energy storage device is disposed such that its center of gravity is more rearward than a rear end of the right front drive steerable wheel in the frontward-rearward direction.

The dual front, single rear-wheeled three-wheeler of (12) has a feature, wherein, in the dual front, single rear-wheeled three-wheeler of any one of (1) to (11), the electric energy storage device is positioned such that its center of gravity is, in the leftward-rightward direction, between a right end of a left front drive steerable wheel movable region through which the left front drive steerable wheel passes upon being steered and a left end of a right front drive steerable wheel movable region through which the right front drive steerable wheel passes upon being steered.

The dual front, single rear-wheeled three-wheeler of (13) has a feature, wherein, in the dual front, single rear-wheeled three-wheeler of any one of (1) to (12), the electric energy storage device is positioned such that its center of gravity is more rearward than a rotation axis of the electric motor in the frontward-rearward direction.

When used in the present description, the term "and/or" includes any or all of combinations of one or a plurality of related and listed items.

When used in the present description, the use of the terms "including", "comprising" or "having" and the variations thereof specifies the presence of the described characteristics, steps, operations, elements, components, and/or equivalents thereof and may include one or a plurality of steps, operations, elements, components and/or groups thereof.

Unless otherwise defined, all terms (including technical terms and scientific terms) used in the present description have the same meanings as commonly understood by a skilled person to whom the present invention belongs.

A term as defined in commonly used dictionaries is to be interpreted to have a meaning corresponding to the meaning in the related art and in the context of the present disclosure, and unless explicitly defined in the present description, the term is never interpreted as an ideal or excessively formal meaning.

In the explanation of the present invention, it is to be understood that the number of techniques and steps are described. Each of these has an individual benefit and each may be used together with at least one of, or in some cases, all of other disclosed techniques. Thus, for clarity, this explanation refrains from unnecessarily repeating all possible combinations of individual steps. Nevertheless, the description and claims are to be read while understanding that such combinations are all within the scope of the present invention and claims.

A large number of specific details for providing complete understanding of the present invention will be described in the following explanations for the purpose of explanation. However, it is apparent that a person skilled in the art can implement the present invention even without these specific details. The present disclosure should be considered as illustration of the present invention and is not intended to limit any specific embodiment expressed by the following drawings and explanations.

The above object and other objects, characteristics, aspects, and advantages of this invention will become further clear from the following detailed explanation on embodiments of this invention in association with the attached drawings.

Effect of the Invention

According to the present invention, electrification of a dual front, single rear-wheeled three-wheeler can be achieved.

DESCRIPTION OF EMBODIMENTS

First Embodiment

[Overall Structure]

Figure 1:
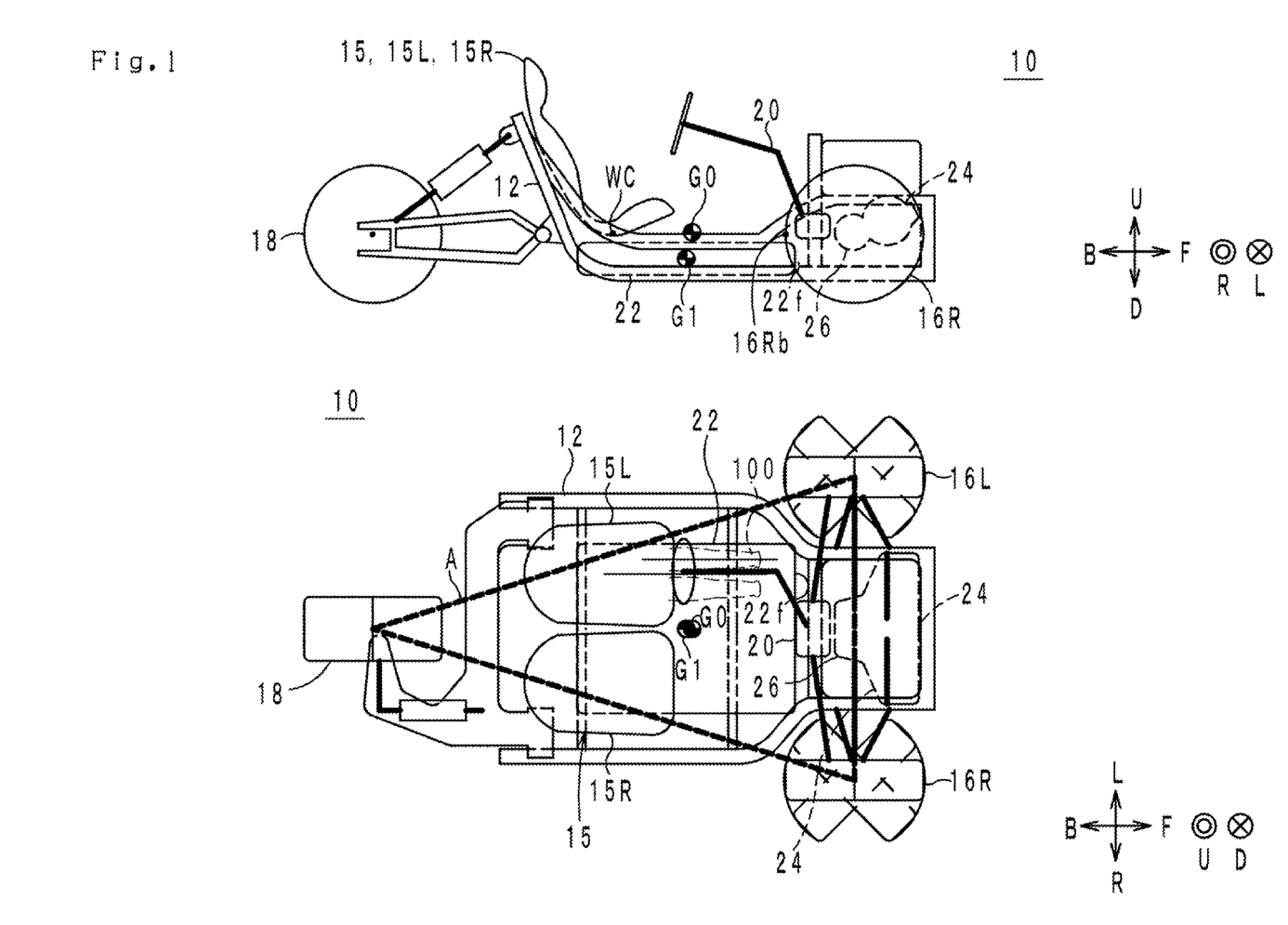
FIG. 1 is a right side view and a top view of a dual front, single rear-wheeled three-wheeler 10.

The overall structure of a dual front, single rear-wheeled three-wheeler 10 according to the first embodiment of the present invention will be described below with reference to the drawings. FIG. 1 is a right side view and a top view of the dual front, single rear-wheeled three-wheeler 10.

Hereinafter, the traveling direction of the dual front, single rear-wheeled three-wheeler 10 is defined as the frontward direction. The rearward direction of the dual front, single rear-wheeled three-wheeler 10 is defined as the rearward direction. The leftward direction of the dual front, single rear-wheeled three-wheeler 10 is defined as the leftward direction. The rightward direction of the dual front, single rear-wheeled three-wheeler 10 is defined as the rightward direction. The upward direction of the dual front, single rear-wheeled three-wheeler 10 is defined as the upward direction. The downward direction of the dual front, single rear-wheeled three-wheeler 10 is defined as the downward direction. The frontward-rearward direction of the dual front, single rear-wheeled three-wheeler 10 is defined as the frontward-rearward direction. The leftward-rightward direction of the dual front, single rear-wheeled three-wheeler 10 is defined as the leftward-rightward direction. The upward-downward direction of the dual front, single rear-wheeled three-wheeler 10 is defined as the upward-downward direction. The upward-downward direction corresponds to the vertical direction.

In the present description, the axes and the members extending in the frontward-rearward direction does not necessarily designate the axes and the members parallel to the frontward-rearward direction. The axes and the members extending in the frontward-rearward direction include the axes and the members tilted in relation to the frontward-rearward direction by an angle within the range of ±45°. Similarly, the axes and the members extending in the upward-downward direction include the axes and the members tilted in relation to the upward-downward direction by an angle within the range of ±45°. The axes and the members extending in the leftward-rightward direction include the axes and the members tilted in relation to the leftward-rightward direction by an angle within the range of ±45°.

When any two members in the present description are respectively defined as a first member and a second member, the relationship between any two members means as follows. In the present description, the wording "a first member is supported by a second member" includes a case where the first member is attached (namely, fixed) to the second member so as to be immovable in relation to the second member and a case where the first member is attached to the second member so as to be movable in relation to the second member. Furthermore, the wording "a first member is supported by a second member" includes both of a case where the first member is directly attached to the second member and a case where the first member is attached to the second member via a third member.

In the present description, the wording "a first member and second member aligned in the frontward-rearward direction" indicates the following state. When the first member and the second member are seen in a direction perpendicular to the frontward-rearward direction, the first member and the second member are both arranged on a certain straight line extending in the frontward-rearward direction. In the present description, the wording "a first member and a second member aligned in the frontward-rearward direction when seen in the upward direction or in the downward direction" indicates the following state. When the first member and the second member are seen in the upward direction or downward direction, the first member and the second member are both arranged on a certain straight line indicating in the frontward-rearward direction. In this case, when the first member and the second member are seen in the leftward direction or the rightward direction, which are different from the upward direction and the downward direction, either one of the first member and the second member may not be arranged on a certain straight line indicating in the frontward-rearward direction. Note that the first member and the second member may be in contact with each other. The first member and the second member may be separated. A third member may be present between the first member and the second member. This definition is applied to directions other than the frontward-rearward direction.

In the present description, the wording "a first member is disposed in front of a second member" refers to the following state. At least a part of the first member is disposed in a region through which the second member passes when the second member moves parallelly in the frontward direction. Thus, the entire first member may be within a region through which the second member passes when the second member moves parallelly in the frontward direction or may protrudes from the region through which the second member passes when the second member moves parallelly in the frontward direction. In this case, the first member and the second member align in the frontward-rearward direction. This definition is applied to directions other than the frontward-rearward direction.

In the present description, the wording "a first member is disposed more frontward than a second member" refers to the following state. The first member is disposed in front of a plane passing the front end of the second member and orthogonal to the frontward-rearward direction. In this case, the first member and the second member may or may not align in the frontward-rearward direction. This definition is applied to directions other than the frontward-rearward direction.

In the present description, the wording "a first member is disposed in front of a second member when seen in the leftward direction or the rightward direction" refers to the following state. When seen in the leftward direction or the rightward direction, at least a part of the first member is disposed in a region through which the second member passes when the second member moves parallelly in the frontward direction. In this definition, the first member and the second member may not align in the frontward-rearward direction in three dimensions. This definition is applied to the directions other than the frontward-rearward direction.

In the present description, each part of the first member is defined as follows unless otherwise specified. The front part of the first member means the front half of the first member. The rear part of the first member means the rear half of the first member. The left part of the first member means the left half of the first member. The right part of the first member means the right half of the first member. The upper part of the first member means the upper half of the first member. The lower part of the first member means the lower half of the first member. The upper end of the first member means the end of the first member in the upward direction. The lower end of the first member means the end of the first member in the downward direction. The front end of the first member means the end of the first member in the frontward direction. The rear end of the first member means the end of the first member in the rearward direction. The left end of the first member means the end of the first member in the leftward direction. The right end of the first member means the end of the first member in the rightward direction. The upper end part of the first member means the upper end and the vicinity thereof of the first member. The lower end part of the first member means the lower end and the vicinity thereof of the first member. The front end part of the first member means the front end and the vicinity thereof of the first member. The rear end part of the first member means the rear end and the vicinity thereof of the first member. The left end part of the first member means the left end and the vicinity thereof of the first member. The right end part of the first member means the right end and the vicinity thereof of the first member. The first member means a member constituting the dual front, single rear-wheeled three-wheeler 10.

In the present description, the wording "a structure (a member, a space, or an opening) is formed (positioned or disposed) between the first member and the second member" means that the structure exists between the first member and the second member in the direction in which the first member and the second member align. However, the structure may or may not protrude from the first member or the second member in a direction orthogonal to a direction in which the first member and the second member align.

As illustrated in FIG. 1, the dual front, single rear-wheeled three-wheeler 10 is provided with a body frame 12, side-by-side seats 15, a left front drive steerable wheel 16L, a right front drive steerable wheel 16R, a rear wheel 18, a front wheel steering mechanism 20, an electric energy storage device 22, an electric motor 24, and a power transmission mechanism 26.

The dual front, single rear-wheeled three-wheeler 10 is a vehicle that does not lean. Thus, the body frame 12 does not lean in the leftward direction when the dual front, single rear-wheeled three-wheeler 10 turns in the leftward direction and does not lean in the rightward direction when the dual front, single rear-wheeled three-wheeler 10 turns in the rightward direction. The body frame 12 supports the side-by-side seats 15, the left front drive steerable wheel 16L, the right front drive steerable wheel 16R, the rear wheel 18, the front wheel steering mechanism 20, the electric energy storage device 22, the electric motor 24, and the power transmission mechanism 26. The body frame 12 is a pipe frame in which metal pipes are joined. As the material of the body frame 12, iron, aluminum, or the like may be listed.

The side-by-side seats 15 include a left seat 15L and a right seat 15R. The left seat 15L is a sit-in type seat. The left seat 15L is disposed at a left rear part of the body frame 12. Furthermore, the left seat 15L is disposed on the body frame 12. A person sat on the left seat 15L faces in the frontward direction. The right seat 15R is a sit-in type seat. The right seat 15R is disposed in the right rear part of the body frame 12 of the dual front, single rear-wheeled three-wheeler 10. Due to this configuration, the right seat 15R is disposed in the right of the left seat 15L. Furthermore, the right seat 15R is disposed on the body frame 12. A person sat on the right seat 15R faces in the frontward direction. An operator sits on the left seat 15L or a right seat 15R. In the present embodiment, an operator sits on the left seat 15L. A passenger sits on the right seat 15R.

The left front drive steerable wheel 16L is disposed in the left front part of the dual front, single rear-wheeled three-wheeler 10. The left front drive steerable wheel 16L is disposed on the left of the front part of the body frame 12. The left front drive steerable wheel 16L rotates around the left front axle.

The right front drive steerable wheel 16R is disposed on the right of the left front drive steerable wheel 16L. The right front drive steerable wheel 16R is disposed in the right front part of the dual front, single rear-wheeled three-wheeler 10. The right front drive steerable wheel 16R is disposed on the right of the front part of the body frame 12. The right front drive steerable wheel 16R rotates around the right front axle.

The rear wheel 18 is disposed more rearward than the left front drive steerable wheel 16L and the right front drive steerable wheel 16R. The rear wheel 18 is disposed at the rear part of the dual front, single rear-wheeled three-wheeler 10. Furthermore, the rear wheel 18 is disposed at the center in the leftward-rightward direction of the dual front, single rear-wheeled three-wheeler 10. That is, the rear wheel 18 is disposed behind the center in the leftward-rightward direction of the body frame 12. The rear wheel 18 rotates around the rear axle. However, the rear wheel 18 is not a driving wheel.

The front wheel steering mechanism 20 steers the left front drive steerable wheel 16L and the right front drive steerable wheel 16R by the operation of an operator. The front wheel steering mechanism 20 includes a steering wheel, a steering shaft, a steering gear box, and two tie rods. When the operator rotates the steering wheel counterclockwise, the left front drive steerable wheel 16L and the right front drive steerable wheel 16R rotate counterclockwise when the dual front, single rear-wheeled three-wheeler 10 is seen in the downward direction. That is, the left front drive steerable wheel 16L and the right front drive steerable wheel 16R are steered in the leftward direction. When the operator rotates the steering wheel clockwise, the left front drive steerable wheel 16L and the right front drive steerable wheel 16R rotate clockwise when the dual front, single rear-wheeled three-wheeler 10 is seen in the downward direction. That is, the left front drive steerable wheel 16L and the right front drive steerable wheel 16R are steered in the rightward direction.

The electric energy storage device 22 stores electric energy. The electric energy storage device 22 is a secondary battery that can be discharged and charged. The electric energy storage device 22 is, for example, a lithium-ion battery. However, the electric energy storage device 22 may be, for example, a nickel-metal hydride battery, a lead-acid battery, and an all-solid-state battery. Alternatively, the electric energy storage device 22 may be a primary battery. The electric energy storage device 22 may be a combination of a battery (a primary battery or a secondary battery) and a capacitor.

The electric motor 24 generates torque by the electrical energy stored in the electric energy storage device 22. The power transmission mechanism 26 transmits the torque generated by the electric motor 24 to the left front drive steerable wheel 16L and the right front drive steerable wheel 16R. The power transmission mechanism 26 may be, for example, a decelerator.

[Arrangement of Side-by-Side Seats and Electric Energy Storage Device]

Next, the arrangement of the side-by-side seats 15 and the electric energy storage device 22 is explained. When the dual front, single rear-wheeled three-wheeler 10 is seen in the downward direction, an area surrounded by a triangle obtained by linking the center of the left front drive steerable wheel 16L, the center of the right front drive steerable wheel 16R, and the center of the rear wheel 18 with straight lines is defined as a triangle area A. The triangle area A is in an isosceles triangle shape. The center of the left front drive steerable wheel 16L is an intersection of a straight line parallel to the frontward-rearward direction and passing the center in the leftward-rightward direction of the left front drive steerable wheel 16L and a straight line parallel to the leftward-rightward direction and passing the center in the frontward-rearward direction of the left front drive steerable wheel 16L when the dual front, single rear-wheeled three-wheeler 10 is seen in the downward direction. Note that the definitions about the center of the right front drive steerable wheel 16R and the center of the rear wheel 18 are the same as the definition about the center of the left front drive steerable wheel 16L, and thus, the explanation therefor is omitted.

Assuming that, when the dual front, single rear-wheeled three-wheeler 10 is seen in the downward direction, an area surrounded by a triangle obtained by linking the center of the left front drive steerable wheel 16L, the center of the right front drive steerable wheel 16R, and the center of the rear wheel 18 with straight lines is defined as a triangle area A, the dual front, single rear-wheeled three-wheeler 10 satisfies the following conditions (A) and (B).

(A) The front end of the side-by-side seats 15 is positioned more rearward than the center of gravity G0 of the dual front, single rear-wheeled three-wheeler 10, the center of gravity G0 being disposed more frontward than the middle point WC of a wheelbase, in the frontward-rearward direction, and at least a part of the side-by-side seats 15 is positioned in the triangle area A when the dual front, single rear-wheeled three-wheeler 10 is seen in the downward direction.

(B) At least a part of the electric energy storage device 22 overlaps a foot 100 of an operator sat on the side-by-side seats 15 when the dual front, single rear-wheeled three-wheeler 10 is seen in the downward direction and is positioned in the triangle area A, and the electric energy storage device 22 is positioned such that its front end 22*f* is more frontward than the center of gravity G0 of the dual front, single rear-wheeled three-wheeler 10 and positioned in the triangle area A, and the electric energy storage device 22 is positioned such that its left end and right end are between the right end of the left front drive steerable wheel 16L and the left end of the right front drive steerable wheel 16R in the leftward-rightward direction.

Note that the center of gravity G0 of the dual front, single rear-wheeled three-wheeler 10 is the center of gravity of the dual front, single rear-wheeled three-wheeler 10 in a state in which any operator and any passenger do not ride. The center of gravity G0 of the dual front, single rear-wheeled three-wheeler 10 is positioned more frontward than the middle point WC of the wheelbase in the frontward-rearward direction as described above. That is, the dual front, single rear-wheeled three-wheeler 10 is positioned more frontward than the middle point WC between the right front axle of the right front drive steerable wheel 16R and the rear axle of the rear wheel 18 in the frontward-rearward direction. The center of gravity G0 of the dual front, single rear-wheeled three-wheeler 10 is, for example, a point internally dividing the right front axle of the right front drive steerable wheel 16R and the rear axle of the rear wheel 18 by 1:2.

[Effect]

According to the dual front, single rear-wheeled three-wheeler 10 as constituted as above, the dual front, single rear-wheeled three-wheeler 10 travels by torque generated by the electric motor 24. Thus, electrification of the dual front, single rear-wheeled three-wheeler 10 is achieved.

According to the dual front, single rear-wheeled three-wheeler 10, the reduction of the load applied on the left front drive steerable wheel 16L and the right front drive steerable wheel 16R can be suppressed, and also the occurrence of rolling on the body frame 12 can be suppressed when the dual front, single rear-wheeled three-wheeler 10 turns in the leftward direction or the rightward direction. More specifically, and the electric energy storage device 22 is positioned such that its left end and right end are between the right end of the left front drive steerable wheel 16L and the left end of the right front drive steerable wheel 16R in the leftward-rightward direction. Thus, the electric energy storage device 22 is disposed in the vicinity of the center in the leftward-rightward direction of the dual front, single rear-wheeled three-wheeler 10. Due to this configuration, the occurrence of rolling on the body frame 12 can be suppressed when the dual front, single rear-wheeled three-wheeler 10 turns in the leftward direction or the rightward direction.

The electric energy storage device 22 is positioned such that its left end and right end are between the right end of the left front drive steerable wheel 16L and the left end of the right front drive steerable wheel 16R in the leftward-rightward direction. Thus, the width of the electric energy storage device 22 in the leftward-rightward direction becomes short. The length in the frontward-rearward direction of the electric energy storage device 22 should be long for ensuring the capacity of the electric energy storage device 22. Then, at least a part of the electric energy storage device 22 overlaps a foot 100 of an operator sat on the side-by-side seats 15 and is positioned in the triangle area A when the dual front, single rear-wheeled three-wheeler 10 is seen in the downward direction. In this way, the electric energy storage device 22 extends toward the front part of the dual front, single rear-wheeled three-wheeler 10. Thus, the load of the electric energy storage device 22 tends to be more greatly applied on the left front drive steerable wheel 16L and the right front drive steerable wheel 16R than the rear wheel 18. Due to this configuration, the reduction of the load applied on the left front drive steerable wheel 16L and the right front drive steerable wheel 16R can be suppressed.

Second Embodiment

[Overall Structure]

Figure 2:
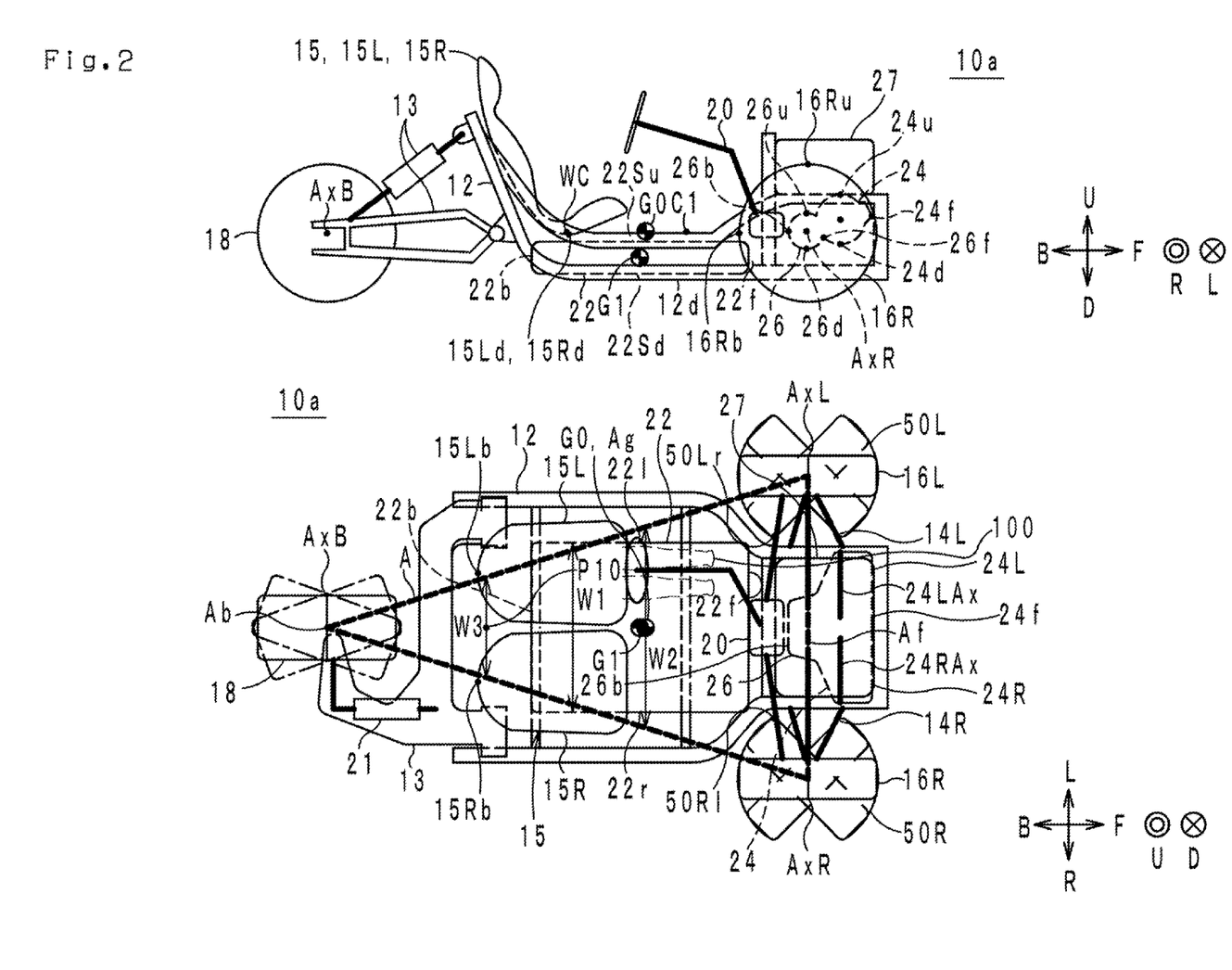
FIG. 2 is a right side view and a top view of a dual front, single rear-wheeled three-wheeler 10*a*.

The overall structure of a dual front, single rear-wheeled three-wheeler 10*a* according to the second embodiment of the present invention will be described below with reference to the drawings. FIG. 2 is a right side view and a top view of the dual front, single rear-wheeled three-wheeler 10*a*.

The dual front, single rear-wheeled three-wheeler 10*a* is an electric-powered vehicle that generates torque by electrical energy. The dual front, single rear-wheeled three-wheeler 10*a* is not an electrically-assisted bicycle that generates torque by human power and electrical energy. Thus, the dual front, single rear-wheeled three-wheeler 10*a* is not provided with any pedals that receive input human power. The dual front, single rear-wheeled three-wheeler 10*a* is not provided with any door. As illustrated in FIG. 2, the dual front, single rear-wheeled three-wheeler 10*a* is provided with a body frame 12, a rear wheel suspension system 13, a left front wheel suspension system 14L, a right front wheel suspension system 14R, side-by-side seats 15, a left front drive steerable wheel 16L, a right front drive steerable wheel 16R, a rear wheel 18, a front wheel steering mechanism 20, a rear wheel steering mechanism 21, an electric energy storage device 22, an electric motor 24, a power transmission mechanism 26, and an EV (Electric Vehicle) unit 27.

The dual front, single rear-wheeled three-wheeler 10a is a vehicle that does not lean. Thus, the body frame 12 does not lean in the leftward direction when the dual front, single rear-wheeled three-wheeler 10a turns in the leftward direction and does not lean in the rightward direction when the dual front, single rear-wheeled three-wheeler 10a turns in the rightward direction. The body frame 12 supports the rear wheel suspension system 13, the left front wheel suspension system 14L, the right front wheel suspension system 14R, the side-by-side seats 15, the left front drive steerable wheel 16L, the right front drive steerable wheel 16R, the rear wheel 18, the front wheel steering mechanism 20, the rear wheel steering mechanism 21, the electric energy storage device 22, the electric motor 24, the power transmission mechanism 26, and the EV (Electric Vehicle) unit 27. The body frame 12 is a pipe frame in which metal pipes are joined. As the material of the body frame 12, iron, aluminum, or the like may be listed.

The side-by-side seats 15 include a left seat 15L and a right seat 15R. The left seat 15L is a sit-in type seat. The left seat 15L is disposed at a left rear part of the body frame 12. Furthermore, the left seat 15L is disposed on the body frame 12. A person sat on the left seat 15L faces in the frontward direction. The right seat 15R is a sit-in type seat. The right seat 15R is disposed in the right rear part of the body frame 12 of the dual front, single rear-wheeled three-wheeler 10a. Due to this configuration, the right seat 15R is disposed in the right of the left seat 15L. Furthermore, the right seat 15R is disposed on the body frame 12. A person sat on the right seat 15R faces in the frontward direction. An operator sits on a left seat 15L or a right seat 15R. In the present embodiment, an operator sits on a left seat 15L. A passenger sits on the right seat 15R.

The left front drive steerable wheel 16L is disposed in the left front part of the dual front, single rear-wheeled three-wheeler 10. The left front drive steerable wheel 16L is disposed on the left of the front part of the body frame 12. The left front drive steerable wheel 16L rotates around the left front axle AxL.

The left front wheel suspension system 14L is supported by the body frame 12 and supports the left front drive steerable wheel 16L. The left front wheel suspension system 14L displaces the left front drive steerable wheel 16L in the upward-downward direction in relation to the body frame 12. However, the left front wheel suspension system 14L does not lean the left front drive steerable wheel 16L in the leftward direction upon left turning. The left front wheel suspension system 14L does not lean the left front drive steerable wheel 16L in the rightward direction upon right turning. Furthermore, when the dual front, single rear-wheeled three-wheeler 10a is seen in the downward direction, the left front wheel suspension system 14L supports the left front drive steerable wheel 16L such that the left front drive steerable wheel 16L rotates clockwise and counterclockwise. The left front wheel suspension system 14L includes one or more arms and a shock absorber (not illustrated). In the present embodiment, the left front wheel suspension system 14L is a double wishbone-type suspension system. However, the left front wheel suspension system 14L is not limited to a double wishbone-type suspension system, and may be a strut-type suspension system, a trailing arm-type suspension system, and the like.

The right front drive steerable wheel 16R is disposed on the right of the left front drive steerable wheel 16L. The right front drive steerable wheel 16R is disposed in the right front part of the dual front, single rear-wheeled three-wheeler 10a. The right front drive steerable wheel 16R is disposed on the right of the front part of the body frame 12. The right front drive steerable wheel 16R rotates around the right front axle AxR.

The right front wheel suspension system 14R is supported by the body frame 12 and supports the right front drive steerable wheel 16R. The right front wheel suspension system 14R displaces the right front drive steerable wheel 16R in the upward-downward direction in relation to the body frame 12. However, the right front wheel suspension system 14R does not lean the right front drive steerable wheel 16R in the leftward direction upon left turning. The right front wheel suspension system 14R does not lean the right front drive steerable wheel 16R in the rightward direction upon right turning. Furthermore, when the dual front, single rear-wheeled three-wheeler 10a is seen in the downward direction, the right front wheel suspension system 14R supports the right front drive steerable wheel 16R such that the right front drive steerable wheel 16R rotates clockwise and counterclockwise. The right front wheel suspension system 14R includes one or more arms and a shock absorber (not illustrated). In the present embodiment, the right front wheel suspension system 14R is a double wishbone-type suspension system. However, the right front wheel suspension system 14R is not limited to a double wishbone-type suspension system, and may be a strut-type suspension system, a trailing arm-type suspension system, and the like.

The rear wheel 18 is disposed more rearward than the left front drive steerable wheel 16L and the right front drive steerable wheel 16R. The rear wheel 18 is disposed at the rear part of the dual front, single rear-wheeled three-wheeler 10a. Furthermore, the rear wheel 18 is disposed at the center in the leftward-rightward direction of the dual front, single rear-wheeled three-wheeler 10a. That is, the rear wheel 18 is disposed behind the center in the leftward-rightward direction of the body frame 12. The rear wheel 18 rotates around the rear axle AxB with respect to the body frame 12. However, the rear wheel 18 is not a driving wheel.

The rear wheel suspension system 13 is supported by the body frame 12 and supports rear wheel 18. The rear wheel suspension system 13 displaces the rear wheel 18 in the upward-downward direction in relation to the body frame 12. However, the rear wheel suspension system 13 does not lean the rear wheel 18 in the leftward direction upon left turning. The rear wheel suspension system 13 does not lean the rear wheel 18 in the rightward direction upon right turning. Furthermore, when the dual front, single rear-wheeled three-wheeler 10 is seen in the downward direction, the rear wheel suspension system 13 supports the rear wheel 18 such that the rear wheel 18 rotates clockwise and counterclockwise. The rear wheel suspension system 13 includes a swing arm and a shock absorber.

The front wheel steering mechanism 20 steers the left front drive steerable wheel 16L and the right front drive steerable wheel 16R by the operation of an operator. The front wheel steering mechanism 20 includes a steering wheel, a steering shaft, a steering gear box, and two tie rods. When the operator rotates the steering wheel counterclockwise, the left front drive steerable wheel 16L and the right front drive steerable wheel 16R rotate counterclockwise when the dual front, single rear-wheeled three-wheeler 10a is seen in the downward direction. That is, the left front drive steerable wheel 16L and the right front drive steerable wheel 16R are steered in the leftward direction. When the operator rotates the steering wheel clockwise, the left front drive steerable wheel 16L and the right front drive steerable wheel 16R rotate clockwise when the dual front, single rear-wheeled three-wheeler 10a is seen in the downward direction. That is, the left front drive steerable wheel 16L and the right front drive steerable wheel 16R are steered in the rightward direction.

The rear wheel steering mechanism 21 steers the rear wheel 18 by the operation of an operator. The rear wheel steering mechanism 21 includes an actuator and a control unit (not illustrated). The control unit drives the actuator on the basis of the operation of the steering wheel by an operator. Due to this configuration, the actuator rotates the rear wheel 18 counterclockwise or clockwise when the dual front, single rear-wheeled three-wheeler 10a is seen in the downward direction.

The electric energy storage device 22 stores electric energy. The electric energy storage device 22 has a rectangular shape when the dual front, single rear-wheeled three-wheeler 10a is seen in the downward direction. The size of the electric energy storage device 22 in the upward-downward direction is smaller than the size of the electric energy storage device 22 in the frontward-rearward direction and the size of the electric energy storage device 22 in the leftward-rightward direction. Due to this configuration, electric energy storage device 22 has a plate shape having an upper surface 22Su and a lower surface 22Sd.

The electric energy storage device 22 is disposed below the side-by-side seats 15. The lower surface 22Sd of the electric energy storage device 22 is positioned more upward than the lower end 12d of the body frame 12. The upper surface 22Su of the electric energy storage device 22 is positioned more downward than the lower end 15Ld of the left seat 15L and the lower end 15Rd of the right seat 15R. Furthermore, the upper surface 22Su of the electric energy storage device 22 is positioned more downward than the left front axle AxL, the right front axle AxR, and the rear axle AxB. The electric energy storage device 22 is positioned such that its front end 22f is more rearward than the left front axle AxL and the right front axle AxR in the frontward-rearward direction. Thus, the rear end 22b of the electric energy storage device 22 is positioned more frontward than the rear axle AxB in the frontward-rearward direction.

The left end 22l of the electric energy storage device 22 is positioned more rightward than the left end of the left seat 15L. The right end 22r of the electric energy storage device 22 is positioned more leftward than the right end of the right seat 15R.

The electric energy storage device 22 as above is a secondary battery that can be discharged and charged. The electric energy storage device 22 is, for example, a lithium-ion battery. However, the electric energy storage device 22 may be, for example, a nickel-metal hydride battery, a lead-acid battery, and an all-solid-state battery. Alternatively, the electric energy storage device 22 may be a primary battery. The electric energy storage device 22 may be a combination of a battery (a primary battery or a secondary battery) and a capacitor.

The electric motor 24 generates torque by the electrical energy stored in the electric energy storage device 22. The power transmission mechanism 26 transmits the torque generated by the electric motor 24 to the left front drive steerable wheel 16L and the right front drive steerable wheel 16R. Here, the electric motor 24 and the power transmission mechanism 26 are explained in detail.

The electric motor 24 includes a left front wheel electric motor 24L and a right front wheel electric motor 24R. The left front wheel electric motor 24L generates torque for rotating the left front drive steerable wheel 16L. The left front wheel electric motor 24L has a rotation axis 24LAx. The rotation axis 24LAx extends in the leftward-rightward direction. The right front wheel electric motor 24R generates torque for rotating the right front drive steerable wheel 16R. The right front wheel electric motor 24R has a rotation axis 24RAx. The rotation axis 24RAx extends in the leftward-rightward direction. In this way, the dual front, single rear-wheeled three-wheeler 10a is provided with the left front wheel electric motor 24L and the right front wheel electric motor 24R, whereby the rotation speed of the left front drive steerable wheel 16L and the rotation speed of the right front drive steerable wheel 16R can be made different. The dual front, single rear-wheeled three-wheeler 10a may turn in the leftward direction or the rightward direction by utilizing the difference between the rotation speed of the left front drive steerable wheel 16L and the rotation speed of the right front drive steerable wheel 16R.

The electric motor 24 is disposed between the left front drive steerable wheel 16L and the right front drive steerable wheel 16R. The electric motor 24 is disposed more frontward than the left front axle AxL and the right front axle AxR. In the present embodiment, the electric motor 24 is disposed in front of the left front axle AxL and the right front axle AxR when the dual front, single rear-wheeled three-wheeler 10a is seen in the leftward direction or the rightward direction. The upper end 24u of the electric motor 24 is positioned more downward than the upper end 16Lu of the left front drive steerable wheel 16L and the upper end 16Ru of the right front drive steerable wheel 16R. The upper end 24u of the electric motor 24 is positioned more upward than the upper surface 22Su of the electric energy storage device 22. The lower end 24d of the electric motor 24 is positioned more upward than the lower surface 22Sd of the electric energy storage device 22.

The power transmission mechanism 26 includes a decelerator and two drive shafts. The power transmission mechanism 26 is disposed between the left front drive steerable wheel 16L and the right front drive steerable wheel 16R. The power transmission mechanism 26 is disposed behind the electric motor 24. Thus, the rear end 26b of the power transmission mechanism 26 is positioned more rearward than the rear end of the electric motor 24. The upper end 26u of the power transmission mechanism 26 is positioned more downward than the upper end 24u of the electric motor 24. The upper end 26u of the power transmission mechanism 26 is positioned more upward than the upper surface 22Su of the electric energy storage device 22. The lower end 26d of the power transmission mechanism 26 is positioned more downward than the lower end 24d of the electric motor 24. The lower end 26d of the power transmission mechanism 26 is positioned more upward than the lower surface 22Sd of the electric energy storage device 22.

The EV unit 27 is a control unit for controlling the entire dual front, single rear-wheeled three-wheeler 10a. The EV unit 27 is disposed above the electric motor 24 and the power transmission mechanism 26.

[Arrangement of Side-by-Side Seats and Electric Energy Storage Device]

Next, the arrangement of the side-by-side seats 15 and the electric energy storage device 22 is explained. When the dual front, single rear-wheeled three-wheeler 10a is seen in the downward direction, an area surrounded by a triangle obtained by linking the center of the left front drive steerable wheel 16L, the center of the right front drive steerable wheel 16R, and the center of the rear wheel 18 with straight lines is defined as a triangle area A. The triangle area A is in an isosceles triangle shape. The front end Af of the triangle area A corresponds to the base of the isosceles triangle. The rear end Ab of the triangle area A corresponds to the apex of the isosceles triangle. The center of the left front drive steerable wheel 16L is an intersection of a straight line parallel to the frontward-rearward direction and passing the center in leftward-rightward direction of the left front drive steerable wheel 16L and a straight line parallel to the leftward-rightward direction and passing the center in the frontward-rearward direction of the left front drive steerable wheel 16L when the dual front, single rear-wheeled three-wheeler 10a is seen in the downward direction. Note that the definitions of the center of the right front drive steerable wheel 16R and the center of the rear wheel 18 are the same as the definition of the center of the left front drive steerable wheel 16L, and thus, the explanation thereof is omitted.

Assuming that, when the dual front, single rear-wheeled three-wheeler 10a is seen in the downward direction, an area surrounded by a triangle obtained by linking the center of the left front drive steerable wheel 16L, the center of the right front drive steerable wheel 16R, and the center of the rear wheel 18 with straight lines is defined as a triangle area A, the dual front, single rear-wheeled three-wheeler 10a satisfies the following conditions (A) and (B).

(A) The front end of the side-by-side seats 15 is positioned more rearward than the center of gravity G0 of the dual front, single rear-wheeled three-wheeler 10a, the center of gravity G0 being disposed more frontward than the middle point WC of a wheelbase, in the frontward-rearward direction, and at least a part of the side-by-side seats 15 is positioned in the triangle area A when the dual front, single rear-wheeled three-wheeler 10a is seen in the downward direction.

(B) At least a part of the electric energy storage device 22 overlaps a foot 100 of an operator sat on the side-by-side seats 15 when the dual front, single rear-wheeled three-wheeler 10a is seen in the downward direction and is positioned in the triangle area A, and the electric energy storage device 22 is positioned such that its front end 22f is more frontward than the center of gravity G0 of the dual front, single rear-wheeled three-wheeler 10a and positioned in the triangle area A, and the electric energy storage device 22 is positioned such that its left end and right end are between the right end of the left front drive steerable wheel 16L and the left end of the right front drive steerable wheel 16R in the leftward-rightward direction.

Note that the center of gravity G0 of the dual front, single rear-wheeled three-wheeler 10a is the center of gravity of the dual front, single rear-wheeled three-wheeler 10a in a state in which any operator and any passenger do not ride. The center of gravity G0 of the dual front, single rear-wheeled three-wheeler 10a is positioned more frontward than the middle point WC of the wheelbase as described above. That is, the center of gravity G0 of the dual front, single rear-wheeled three-wheeler 10a is positioned more frontward than the middle point WC between the right front axle AxR of the right front drive steerable wheel 16R and the rear axle AxB of the rear wheel 18 in the frontward-rearward direction. The center of gravity G0 of the dual front, single rear-wheeled three-wheeler 10 is, for example, a point internally dividing the right front axle of the right front drive steerable wheel 16R and the rear axle of the rear wheel 18 by 1:2.

The front end 22f of the electric energy storage device 22 is positioned in the triangle area A when the dual front, single rear-wheeled three-wheeler 10a is seen in the downward direction. Thus, the front end 22f of the electric energy storage device 22 does not protrude from the triangle area A when the dual front, single rear-wheeled three-wheeler 10a is seen in the downward direction. However, a part of the electric energy storage device 22 is positioned outside the triangle area A when the dual front, single rear-wheeled three-wheeler 10a is seen in the downward direction. In the present embodiment, the vicinity of the right rear end and the vicinity of the left rear end of the electric energy storage device 22 are positioned outside the triangle area A when the dual front, single rear-wheeled three-wheeler 10a is seen in the downward direction. Furthermore, at least a part of the electric energy storage device 22 overlaps the left seat 15L and the right seat 15R in the triangle area A when the dual front, single rear-wheeled three-wheeler 10a is seen in the downward direction. In the present embodiment, a part of the electric energy storage device 22 overlaps the left seat 15L and the right seat 15R in the triangle area A when the dual front, single rear-wheeled three-wheeler 10a is seen in the downward direction.

The electric energy storage device 22 is positioned such that its front end 22f is more frontward than the center of gravity Ag of the triangle area A in the frontward-rearward direction. The maximum width W1 of the electric energy storage device 22 in the leftward-rightward direction is smaller than the width W2 of the triangle area A in the leftward-rightward direction at the center of gravity Ag of the triangle area A. Furthermore, the maximum width W1 of the electric energy storage device 22 in the leftward-rightward direction is larger than a width W3 of the triangle area A in the leftward-rightward direction at the middle point P10 between the center of gravity Ag of the triangle area A and the rear end Ab of the triangle area A.

Next, the position of the center of gravity G1 of the electric energy storage device 22 is explained. The center of gravity G1 of the electric energy storage device 22 is positioned in the vicinity of the intersection of the diagonal lines of the upper surface 22Su of the electric energy storage device 22 when the dual front, single rear-wheeled three-wheeler 10a is seen in the downward direction. The center of gravity G1 of the electric energy storage device 22 is positioned in the vicinity of the intersection of the diagonal lines of the left surface or the vicinity of the intersection of the diagonal lines of the right surface of the electric energy storage device 22 when the dual front, single rear-wheeled three-wheeler 10a is seen in the leftward direction or the rightward direction.

The center of gravity G1 of the electric energy storage device 22 is positioned more frontward than the middle point WC of the wheelbase in the frontward-rearward direction. The center of gravity G1 of the electric energy storage device 22 is positioned more rearward than the midpoint C1 between the right front axle AxR of the right front drive steerable wheel 16R and the middle point WC in the frontward-rearward direction. In the present embodiment, the center of gravity G1 of the electric energy storage device 22 is, for example, positioned in the vicinity of a point internally dividing the right front axle of the right front drive steerable wheel 16R and the rear axle of the rear wheel 18 by 1:2.

The center of gravity G1 of the electric energy storage device 22 is disposed more rearward than the rear end 16Rb of the right front drive steerable wheel 16R in the frontward-rearward direction. Furthermore, the center of gravity G1 of the electric energy storage device 22 is positioned more rearward than the rotation axes 24LAx and 24RAx of the electric motor 24 when the dual front, single rear-wheeled three-wheeler 10 is seen in the downward direction.

The center of gravity G1 of the electric energy storage device 22 is positioned, in the leftward-rightward direction, between the right end 50Lr of a left front drive steerable wheel movable region 50L through which the left front drive steerable wheel 16L passes upon steering and the left end 50Rl of a right front drive steerable wheel movable region 50R through which the right front drive steerable wheel 16R passes upon steering.

Next, the position of the side-by-side seats 15 is explained. At least a part of the left seat 15L and/or at least a part of the right seat 15R are/is positioned in the triangle area A when the dual front, single rear-wheeled three-wheeler 10a is seen in the downward direction. In the present embodiment, a part of the left seat 15L is positioned in the triangle area A when the dual front, single rear-wheeled three-wheeler 10a is seen in the downward direction. A part of the left part of the left seat 15L is positioned outside the triangle area A when the dual front, single rear-wheeled three-wheeler 10a is seen in the downward direction. A part of the right seat 15R is positioned in the triangle area A when the dual front, single rear-wheeled three-wheeler 10a is seen in the downward direction. A part of the right part of the right seat 15R is positioned outside the triangle area A when the dual front, single rear-wheeled three-wheeler 10a is seen in the downward direction. The left seat 15L and the right seat 15R are positioned between the right end of the left front drive steerable wheel 16L and the left end of the right front drive steerable wheel 16R in the leftward-rightward direction.

A part of the electric motor 24 and/or a part of the power transmission mechanism 26 are/is positioned more frontward than the front end Af of the triangle area A in the frontward-rearward direction. In the present embodiment, the entire electric motor 24 is positioned more frontward than the front end Af of the triangle area A in the frontward-rearward direction. A part of the power transmission mechanism 26 is positioned more frontward than the front end Af of the triangle area A in the frontward-rearward direction.

[Effect]

According to the dual front, single rear-wheeled three-wheeler 10a as constituted as above, the dual front, single rear-wheeled three-wheeler 10a travels by torque generated by the electric motor 24. Thus, electrification of the dual front, single rear-wheeled three-wheeler 10a is achieved.

In the dual front, single rear-wheeled three-wheeler 10a, on the same reason as the dual front, single rear-wheeled three-wheeler 10, the reduction of the load applied on the left front drive steerable wheel 16L and the right front drive steerable wheel 16R can be suppressed, and also the occurrence of rolling on the body frame 12 can be suppressed when the dual front, single rear-wheeled three-wheeler 10a turns in the leftward direction or the rightward direction.

According to the dual front, single rear-wheeled three-wheeler 10a, at least a part of the left seat 15L and/or at least a part of the right seat 15R are positioned in the triangle area A when the dual front, single rear-wheeled three-wheeler 10a is seen in the downward direction. Due to this configuration, at least a part of an operator and/or at least a part of a passenger are/is positioned in the triangle area A when the dual front, single rear-wheeled three-wheeler 10a is seen in the downward direction. Thus, the operator and/or the passenger are/is disposed in the vicinity of the center in the leftward-rightward direction of the dual front, single rear-wheeled three-wheeler 10a. Due to this configuration, the occurrence of rolling on the body frame 12 can be suppressed when the dual front, single rear-wheeled three-wheeler 10a turns in the leftward direction or the rightward direction.

According to the dual front, single rear-wheeled three-wheeler 10a, the left seat 15L and the right seat 15R are positioned between the right end of the left front drive steerable wheel 16L and the left end of the right front drive steerable wheel 16R when the dual front, single rear-wheeled three-wheeler 10a is seen in the downward direction. Due to this configuration, the operator and the passenger are positioned between the right end of the left front drive steerable wheel 16L and the left end of the right front drive steerable wheel 16R when the dual front, single rear-wheeled three-wheeler 10a is seen in the downward direction. Thus, the operator and/or the passenger are/is disposed in the vicinity of the center in the leftward-rightward direction of the dual front, single rear-wheeled three-wheeler 10a. Due to this configuration, the occurrence of rolling on the body frame 12 can be suppressed when the dual front, single rear-wheeled three-wheeler 10a turns in the leftward direction or the rightward direction.

According to the dual front, single rear-wheeled three-wheeler 10a, a part of the electric energy storage device 22 is positioned outside the triangle area A when the dual front, single rear-wheeled three-wheeler 10a is seen in the downward direction. Due to this configuration, the size of the electric energy storage device 22 becomes large and the capacity of the electric energy storage device 22 becomes large.

According to the dual front, single rear-wheeled three-wheeler 10a, the reduction of the load applied on the left front drive steerable wheel 16L and the right front drive steerable wheel 16R can be suppressed. More specifically, the electric motor 24 and the power transmission mechanism 26 are heavy objects. Thus, a part of the electric motor 24 and/or a part of the power transmission mechanism 26 are/is positioned more frontward than the front end Af of the triangle area A in the frontward-rearward direction. Due to this configuration, the load of the electric motor 24 and/or the load of the power transmission mechanism 26 tend(s) to be more greatly applied on the left front drive steerable wheel 16L and the right front drive steerable wheel 16R than on the rear wheel 18. As a result, the reduction of the load applied on the left front drive steerable wheel 16L and the right front drive steerable wheel 16R can be suppressed.

According to the dual front, single rear-wheeled three-wheeler 10a, the reduction of the load applied on the left front drive steerable wheel 16L and the right front drive steerable wheel 16R can be suppressed. More specifically, the electric energy storage device 22 is a heavy object. Then, the front end 22f of the electric energy storage device 22 is positioned more frontward than the center of gravity Ag of the triangle area A in the frontward-rearward direction. Due to this configuration, the load of the electric energy storage device 22 tends to be more greatly applied on the left front drive steerable wheel 16L and the right front drive steerable wheel 16R than the rear wheel 18. As a result, the reduction of the load applied on the left front drive steerable wheel 16L and the right front drive steerable wheel 16R can be suppressed.

According to the dual front, single rear-wheeled three-wheeler 10a, the occurrence of rolling on the body frame 12 can be suppressed when the dual front, single rear-wheeled three-wheeler 10a turns in the leftward direction or the rightward direction. More specifically, the maximum width W1 of the electric energy storage device 22 in the leftward-rightward direction is smaller than the width W2 of the triangle area A in the leftward-rightward direction at the center of gravity of the triangle area A. Thus, the maximum width W1 of the electric energy storage device 22 in the leftward-rightward direction is small. Due to this configuration, the electric energy storage device 22 can be easily disposed in the vicinity of the center in the leftward-rightward direction of the dual front, single rear-wheeled three-wheeler 10a. As a result, the occurrence of rolling on the body frame 12 can be suppressed when the dual front, single rear-wheeled three-wheeler 10a turns in the leftward direction or the rightward direction.

According to the dual front, single rear-wheeled three-wheeler 10a, the capacity of the electric energy storage device 22 becomes large because the maximum width W1 of the electric energy storage device 22 in the leftward-rightward direction is large.

Other Embodiments

Embodiments and modifications for which at least either description, or illustration by the drawings are made in the present description are provided for facilitating the understanding of the present disclosure and do not limit the concept of the present disclosure. The above embodiments and modifications may be changed or modified without deviating from the spirit thereof.

The spirit includes equivalent elements, corrections, deletions, combinations (combinations of characteristics over some embodiments and modifications), improvements, and changes that can be recognized by a person skilled in the art on the basis of the embodiments disclosed in the present description. The limitations in claims should be interpreted widely on the basis of the terms used in claims and should not be limited to the embodiments and modifications disclosed in the present description or the prosecution of the present application. Such embodiments and modifications are to be interpreted as non-exclusive. For example, the terms "preferably" and "may" used in the present description are non-exclusive and mean "preferable but not limited to these" and "may . . . but not limited to these", respectively.

In the dual front, single rear-wheeled three-wheelers 10 and 10a, the electric motor 24 is disposed in front of the power transmission mechanism 26. However, the electric motor 24 may be disposed above the power transmission mechanism 26 and may be disposed behind the power transmission mechanism 26, and may be disposed below the power transmission mechanism 26.

Note that, in the dual front, single rear-wheeled three-wheelers 10 and 10a, the rear wheel 18 may not be steered.

REFERENCE SIGNS LIST 10, 10a: Dual front, single rear-wheeled three-wheeler
12: Body frame
13: Rear wheel suspension system
14L: Left front wheel suspension system
14R: Right front wheel suspension system
15: Side-by-side seats
15L: Left seat
15R: Right seat
16L: Left front drive steerable wheel
16R: Right front drive steerable wheel
18: Rear wheel
20: Front wheel steering mechanism
21: Rear wheel steering mechanism
22: Electric energy storage device
24: Electric motor
24L: Left front wheel electric motor
24LAx: Rotation axis
24R: Right front wheel electric motor
24RAx: Rotation axis
26: Power transmission mechanism
50L: Left front drive steerable wheel movable region
50R: Right front drive steerable wheel movable region
A: Triangle area
AxB: Rear axle
AxL: Left front axle
AxR: Right front axle
G0, G1: Center of gravity

The invention claimed is:
1. A three-wheeler comprising:
two front wheels including a left front drive steerable wheel and a right front drive steerable wheel, and a rear wheel;
two seats, including a left seat and a right seat that are arranged side by side in a leftward-rightward direction of the three-wheeler and are each of a sit-in type configured for an operator to sit therein;
a steering mechanism configured to steer the left front drive steerable wheel and the right front drive steerable wheel by operation of the operator;
an electric energy storage device configured to store electrical energy;
an electric motor configured to generate a torque using the electrical energy stored in the electric energy storage device;
a power transmission mechanism configured to transmit the torque generated by the electric motor to the left front drive steerable wheel and the right front drive steerable wheel; and
a body frame that supports the two front wheels, the rear wheel, the two seats, the steering mechanism, the electric energy storage device, the electric motor, and the power transmission mechanism, the body frame not leaning leftward or rightward upon left or right turning of the three-wheeler, wherein
a front end of the two seats is positioned more rearward than a center of gravity of the three-wheeler;
the center of gravity of the three-wheeler is disposed more frontward than a middle point of a wheelbase, the wheelbase being a distance in the frontward-rearward direction between a center of the left or right front drive steerable wheel and a center of the rear wheel;
at least a part of the two seats is positioned, in a top view of the three-wheeler, in a triangle area, the triangle area being a triangle having the center of the left front drive steerable wheel, the center of the right front drive steerable wheel, and the center of the rear wheel, as vertices thereof;
at least a part of the electric energy storage device, in the top view of the three-wheeler, overlaps an area on the three-wheeler for the operator sitting on one of the two seats to put a foot therein, and is positioned in the triangle area;
a front end of the electric energy storage device is more frontward than the center of gravity of the three-wheeler; and
a left end and a right end of the electric energy storage device are between a right end of the left front drive steerable wheel and a left end of the right front drive steerable wheel in the leftward-rightward direction.

2. The three-wheeler according to claim 1, wherein
the front end of the electric energy storage device is positioned in the triangle area in the top view of the three-wheeler.
3. The three-wheeler according to claim 1, wherein
at least a part of the left seat and/or at least a part of the right seat are/is positioned in the triangle area in the top view of the three-wheeler.
4. The three-wheeler according to claim 1, wherein
the left seat and the right seat are positioned between the right end of the left front drive steerable wheel and the left end of the right front drive steerable wheel in the top view of the three-wheeler.
5. The three-wheeler according to claim 1, wherein
a part of the electric energy storage device is positioned outside the triangle area in the top view of the three-wheeler.
6. The three-wheeler according to claim 1, wherein
a part of the electric motor and/or a part of the power transmission mechanism is/are positioned more frontward than a front end of the triangle area in the frontward-rearward direction.
7. The three-wheeler according to claim 1, wherein
the front end of the electric energy storage device is more frontward than a center of gravity of the triangle area in the frontward-rearward direction.
8. The three-wheeler according to claim 1, wherein
a maximum width of the electric energy storage device in the leftward-rightward direction is smaller than a width of the triangle area in the leftward-rightward direction at a center of gravity of the triangle area.
9. The three-wheeler according to claim 1, wherein
a maximum width of the electric energy storage device in the leftward-rightward direction is larger than a width of the triangle area in the leftward-rightward direction at a middle point between a center of gravity of the triangle area and a rear end of the triangle area.
10. The three-wheeler according to claim 1, wherein
at least a part of the electric energy storage device overlaps the left seat and the right seat in the triangle area in the top view of the three-wheeler.
11. The three-wheeler according to claim 1, wherein
a center of gravity of the electric energy storage device is more rearward than a rear end of the right front drive steerable wheel in the frontward-rearward direction.
12. The three-wheeler according to claim 1, wherein
a center of gravity of the electric energy storage device is, in the leftward-rightward direction, between
a right end of a left front drive steerable wheel movable region through which the left front drive steerable wheel passes upon being steered,
and
a left end of a right front drive steerable wheel movable region through which the right front drive steerable wheel passes upon being steered.
13. The three-wheeler according to claim 1, wherein
a center of gravity of the electric energy storage device is more rearward than a rotation axis of the electric motor in the frontward-rearward direction.

* * * * *